United States Patent [19]

Speakman

[11] 3,935,187

[45] Jan. 27, 1976

[54] PROCESS FOR DEPOLYMERIZING AMYLACEOUS POLYMERS

[75] Inventor: Edwin L. Speakman, Clinton, Iowa

[73] Assignee: Standard Brands Incorporated, New York, N.Y.

[22] Filed: Aug. 12, 1974

[21] Appl. No.: 496,609

Related U.S. Application Data

[63] Continuation-in-part of Ser. No. 408,030, Oct. 19, 1973, abandoned.

[52] U.S. Cl. .................... 260/233.3 R; 260/233.5
[51] Int. Cl.² ................... C08B 33/00; C08B 31/00
[58] Field of Search.... 260/233.3 R, 233.3 A, 233.5

[56] References Cited

UNITED STATES PATENTS 3,655,644   4/1972   Durand ...................... 260/233.3 R

*Primary Examiner*—Lewis T. Jacobs

[57] ABSTRACT

Granular starch is partially depolymerized by reaction with hydrogen peroxide in the presence of a salt selected from the group consisting of alkali metal chlorides, ammonium chlorides and mixtures thereof, and cupric ions while maintaining the pH of the reaction mixture in the range of from about 5.5 to about 7 by the addition of alkali thereto.

8 Claims, No Drawings

PROCESS FOR DEPOLYMERIZING AMYLACEOUS POLYMERS

This application is a continuation-in-part of patent application Ser. No. 408,030 filed Oct. 19, 1973, now abandoned.

THE INVENTION

This invention relates to a process for partially depolymerizing granular starch. More particularly, this invention relates to a process for partially depolymerizing granular starch by the use of hydrogen peroxide.

The use of peroxides for the treatment or modification of starch has been disclosed in the art. U.S. Pat. No. 1,020,656 to Perkins discloses the treatment of starch with sodium peroxide under highly alkaline conditions to produce a glue base. U.S. Pat. No. 2,204,615 to Nivling discloses the oxidation of dry starch with peroxides in a fluidized system to obtain a soluble starch product. U.S. Pat. No. 2,268,215 to Kerr discloses treating starch under highly alkaline conditions with calcium peroxide to produce a thin boiling starch product. U.S. Pat. No. 2,276,984 to Kauffman et al. discloses treating starch with peroxides in the presence of salts such as a copper sulfate and U.S. Pat. Nos. 2,291,041 and 2,307,684 also to Kauffman et al. teach treating starch with peroxide while cooking the starch. U.S. Pat. No. 3,264,283 to Jarowenko discloses the conversion of cyanoethyl groups in starch to amidoethyl groups by a hydrogen peroxide treatment. U.S. Pat. No. 3,539,366 to Ewing discloses a process for pasting starch whereby the starch is contacted with hydrogen peroxide for a period of less than 30 seconds before the starch is subjected to pasting conditions. U.S. Pat. No. 3,655,644 to Durand discloses thinning of derivatized starch under highly alkaline conditions in the presence of copper ions which act as a catalyst for the hydrogen peroxide.

Although, from the above, it is apparent that a relatively large amount of experimentation has been conducted in regard to peroxide treatment of starches, such treatments have not found widespread commercial acceptance.

Two methods, principally, are being used on a commercial scale for depolymerizing starch. These are the acid modification method and the hypochlorite oxidation method. In the former method, an aqueous starch preparation is treated with an acid, e.g., HCl, at temperatures generally below 130°F. and at pH levels of from 0.6 to 1.8 for prolonged periods, e.g., 24 hours. The second method generally involves treating an aqueous slurry of starch with an alkali metal or alkaline earth metal hypochlorite such as NaOCl or Ca(OCl)$_2$.

There are a number of problems associated with these methods of depolymerizing granular starch. For example, in the acid process, the conditions of relatively low pH and high temperature have a deleterious effect on the equipment used in the process. Additionally, when acid depolymerized starch is pasted or gelatinized there is a tendency for the pasted starch to retrograde in a relatively short period. In the hypochlorite oxidation method, relatively large amounts or carboxylic groups are present in the depolymerized starch. These carboxylic groups have the tendency to repel pigments, such as clay, when such oxidized starches are used in paper making, thus causing excessive losses of the pigment. In preparing depolymerized starch products by both of these methods, large amounts of salts are formed which must be removed. The removal of these salts involves washing and, in some instance, resuspending and again washing the depolymerized products. The resulting wash water contains relatively large amounts of salts which present potential disposal problems.

It is the principal object of the present invention to provide a method for partially depolymerizing granular starch whereby the resulting product when pasted or gelatinized does not retrograde as rapidly as acid modified starch.

It is another object of the present invention to provide a method for partially depolymerizing granular starch whereby the resulting product contains a minimal amount of carboxylic groups.

It is still a further object of the present invention to provide a method for partially depolymerizing granular starch wherein a minimal amount of salt is formed.

It is still a further object of the present invention to provide a method for partially depolymerizing granular starch wherein the method is performed at substantially neutral pH.

It is still a further object of the present invention to provide a method for partially depolymerizing granular starch in very short reaction times under readily controllable conditions.

These objects and other objects of the present invention which will be apparent from the following description are attained in accordance with the present invention by reacting an aqueous mixture of granular starch with hydrogen peroxide in the presence of a salt selected from the group consisting of alkali metal chlorides, ammonium chlorides and mixtures thereof, and cupric ions while maintaining the pH of the aqueous mixture in the range of from about 5.5 to about 7 by the addition of an alkali, the reaction conditions being such that the granular structure of the starch is maintained.

Although I do not wish to be bound by a theory, it is believed that the hydrogen peroxide exerts a hydrolytic action on the starch polymer whereby the oxygen linkages between the anhydroglucose units are randomly broken to form polymer fragments having reducing end groups. The reducing end groups are then oxidized to the carboxylic acid form. The formation of the carboxylic acid groups results in a decrease of the pH of the reaction mixture. Maintaining the pH of the reaction mixture in the range of from about 5.5 to about 7 by continuous or periodic addition of an alkali results in the conversion of the carboxylic acid groups to salt form. Performing the depolymerization in this manner results in more efficient utilization of the hydrogen peroxide as opposed to performing the depolymerization under alkaline conditions. Additionally, the resulting product is readily susceptible to gelatinization or pasting and films thereof have good clarity. The exact reason for these beneficial results being imparted to starch depolymerized by the present process is unknown but it is believed to be due to the formation of ionizable salt groups on the depolymerized starch. Since the present process is performed under essentially neutral conditions of pH, excessive alkali is not present. The presence of excessive alkali requires neutralization of the same with the concomitant formation of salts which must be removed by repeated washing.

Suitable alkalis for reaction pH control include ammonium and alkali metal hydroxides, calcium hydroxide, sodium carbonate, sodium oxide, calcium oxide, trisodium phosphate and sodium biphosphate. Sodium hydroxide is preferred for reasons of economy.

The concentration of the starch in the present process is not critical but, for handling efficiency and other practical reasons, the typical starch concentration will be in the range of from about 35 to about 43 percent by weight.

The amount of hydrogen peroxide used in the present process depends upon the degree to which it is desired to depolymerize the starch. Because the utilization of hydrogen peroxide is extremely efficient in the present process, it is contemplated that only small amounts of hydrogen peroxide will be necessary to obtain the desired depolymerized starch product, for instance, from about 0.5 to about 2 percent. Larger amounts of hydrogen peroxide may be used if it is desired to obtain a relatively high degree of depolymerization but excessive losses of starch may result because of greatly increased solubility of highly depolymerized starch.

While hydrogen peroxide is the preferred peroxidic reagent for the present process, other peroxidic compounds which decompose in water to form hydrogen peroxide may be used as well, so long as their decomposition products do not inhibit the process reaction. Suitable other peroxidic reagents include calcium peroxide, urea peroxide and potassium peroxydisulfate.

The presence of cupric ions in the reaction mixture catalyzes the hydrolytic action of the hydrogen peroxide. Typically, the concentration of cupric ion will be from about 0.0005 to about 0.025 percent by weight and preferably will be in the range of from about 0.0025 to about 0.01 percent on the same weight basis. Excessive amounts of cupric ions cause exceedingly rapid decomposition of the hydrogen peroxide which results in loss of efficiency of the hydrogen peroxide. Suitable sources of cupric ions are the chloride, nitrate and sulfate salts of copper. Copper chloride is preferred for reasons of economy.

The presence of alkali metal and ammonium chlorides in the reaction mixture activates of accelerates the catalytic effect of copper ion on the action of hydrogen peroxide so that the peroxide reacts more efficiently with the starch. The presence of these salts at levels as low as 0.1 percent by weight results in some activation but it is preferred to use these salts at concentrations of from about 1 to about 5 percent by weight. At higher levels of these salts, the hydrogen peroxide decomposes exceedingly rapidly resulting in loss of efficiency of the hydrogen peroxide.

The reaction temperature is not critical but must be below the temperature at which damage to the starch granules occurs, i.e., about 150°F. Typically, the present process will be performed at temperatures in the range of from about 100° to about 140°F. and preferably from about 110° to about 130°F. Lower temperatures may be used but exceedingly long reaction periods may be necessary to obtain the desired degree of depolymerization.

The reaction time required by the present process is dependent upon the degree to which it is desired to depolymerize the starch and upon the temperature, amount of hydrogen peroxide, pH, amount of alkali metal and ammonium chlorides and the amount of cupric ions present in the reaction mixture. It is contemplated, however, under the preferred conditions of the present invention, that the desired degree of depolymerization will be achieved in a period of from about 3 to about 30 minutes.

In the above description of the present invention and in the following examples and claims, the amount of hydrogen peroxide referred to is based on hydrogen peroxide at a theoretical concentration of 100 percent. This is done only for the purpose of describing and claiming the invention since it is contemplated that in practicing the present invention an aqueous solution of hydrogen peroxide will be used.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout the specification, percentages refer to percent by weight based on the dry substance weight of the starch, unless otherwise specified.

In the following examples, various test procedures are referred to. These tests were performed by the following methods:

Alkaline Paste Fluidity

All fluidity measurements in the following examples, unless otherwise indicated, are alkaline Paste Fluidities (APF) measured in accordance with the procedure described by Fetzer and Kirst in Cereal Chemistry, Vol. 36, pp. 108–127 (1959). Fluidities were run on an 18 gram, 10% wt. moisture basis unless otherwise indicated.

Carboxyl Content

A sample of starch (5.00 g. dry basis) was mixed into 25 ml of 0.1 normal hydrochloric acid solution. The suspension was stirred periodically for 30 minutes at room temperature and the starch then filtered off on a medium porosity sintered glass filter. The starch on the filter was washed with distilled water until the filtrate was found to be free of chloride ions. The starch was then washed from the filter into a beaker and the suspension made up to 400 ml with distilled water. The suspension was quickly heated with stirring to and held at a gently rolling boil for 5–7 minutes. After the addition of 8–10 drops of phenolphthalein indicator solution, the paste was titrated hot with 0.1 normal sodium hydroxide solution to the first permanent (15 second duration) light pink color. The percent carboxyl content was calculated from the titer.

Inherent Viscosity (IV)

1.000 g. dry basis starch was suspended in 100.0 ml of distilled water at 95°F, mixed with 100.0 ml of 2.00 molar sodium hydroxide solution at 95°F, stirred for 30 minutes, filtered through 6.0-cm coarse porosity fritted glass funnel and flow time (t) determined at 95°F using a No. 75 Ubbelohde viscometer. The flow time ($t_o$) of 1.00 molar sodium hydroxide solution at 95°F was determined. The inherent viscosity (IV) was calculated as $$IV = \frac{\ln(t/t_o)}{C}$$

where C is the starch concentration in g/100 ml.

Hot Fluidity

An 18 g. sample at 10 percent moisture basis (16.2 g. dry basis) was placed in a Monel metal beaker with 307 ml of tap water, the mixture heated in a steam chest with 5 psi steam and held at a gently rolling boil for 1 minute. The paste was cooled immediately in a cold water bath to 75°F, poured into a glass fluidity funnel and the milliliters of paste delivered from the funnel and the water value time was determined. Water value is the time required for 200 ml of 300 ml of water in the funnel to flow through the orifice. The volume of delivered paste divided by 2 is the hot fluidity value. The funnel is described by Willard L. Morgan and Normal L. Vaughn, "Starch Viscosity or Strength", *Industrial and Engineering Chemistry*, Vol. 35, pp. 233–238, (Feb. 1943).

Setback Fluidity

The remaining paste in the fluidity funnel used in the Hot Fluidity determination was combined with that through the funnel, mixed with about one half milliliter of toluene, placed in a jar and capped and stored in a 75°F water bath for 24 hours. After that period, the sample was poured back into the funnel and fluidity determined as before. Retrogradation of the starch during the 24 hour hold period causes the paste to thicken and results in a lower fluidity value compared to the original value. Where there is no retrogradation, the original and the 24 hour fluidities are the same. The greater the difference in the two fluidities, the greater the degree of retrogradation of the stored starch.

Brabender Cook

A 50 g. dry basis starch sample was mixed with deionized water to about 490 ml volume, pH adjusted to 6.5 with dilute sodium hydroxide or hydrochloric acid solution as needed and the mixture volume made up to 500 ml. The mixture was poured into the bowl of a Brabender AMYLO/visco/GRAPH and preheated to 122°F; heated to 203°F in 30 minutes; held at 203°F for 30 minutes; cooled to 122°F in 30 minutes; and held at 122°F for 30 minutes. Heating and cooling were done automatically at 2.3°F per minute. The viscosity was recorded as Brabender Units taken from the instrument chart, with due allowance for the sensitivity of the cartridge used in the instrument. Retrogradation is indicated by the magnitude of the change in viscosity during holding at 122°F. The more this viscosity increases, the greater is the setback or retrogradation.

Gel Strength

A Brabender cook was made as described above to the end of the hold period at 203°F, the hot paste was poured into Gaertner jars with discs previously positioned in place, the surface of the paste in the jars was covered with light mineral oil and the jars stored 24 hours in a 75°F water bath. Gel strength was then determined using a Corn Industries Gelometer manufactured by Gaertner Scientific Corp., Chicago, Illinois. The procedure for this test is given by E. T. Hjermstad, "A Recording Gel Tester", *Cereal Chemistry*, Vol. 32, pp. 200–207, (May 1955).

Unreacted Hydrogen Peroxide After Reaction is Complete:

Determined by filtering a sample of the reaction slurry and analyzing the filtrate for hydrogen peroxide by combining 50 ml of filtrate with 40 ml of water containing 4 g of KI and 10 ml of a 1 to 10 dilution of concentrated HCl solution. After 20 minutes, sufficient 0.1 N sodium thiosulfate solution was added to discharge the blue color of the starch-iodine complex. Based upon the amount of thiosulfate used and the starch content of the sample, the percent unreacted hydrogen peroxide present in the mixture was determined.

EXAMPLE I

This example illustrates the effect of cupric ions and a chloride salt activator on the utilization of hydrogen peroxide for depolymerizing granular starch.

Granular corn starch was mixed with sufficient deionized water to obtain a number of 300 ml slurries each containing 39.1 percent starch. The slurries were placed in containers each equipped with a stirrer and then heated to 120°F. Sodium chloride and copper salts were added in the amounts set forth in Table I and the pH of each slurry was adjusted to 6.5 with 2 percent sodium hydroxide solution. Then, 0.36 percent hydrogen peroxide was added. The pH was maintained in the range of 6.2 to 6.5 by periodic addition of 1 percent sodium hydroxide solution. At the end of 30 minutes following addition of the hydrogen peroxide, 0.36 percent sodium bisulfite was added to each of the slurries and the pH of the slurries was adjusted to 6.5. The slurries were filtered and washed on the filter with 1 cake volume of water. The cakes were puddled and dried in a laboratory model Proctor & Schwartz drier at an air temperature of 200°F.

Various characteristics of the products were determined and are set forth below in Table 1.

TABLE 1

Comparison of Depolymerization Reaction Variables-Interactions of Catalyst, Activator and Peroxide

| Reactants Added (percent) | | | | Reaction System | | | | | Finished Product | |
|---|---|---|---|---|---|---|---|---|---|---|
| $CuCl_2$ | $CuSO_4$ | $H_2O_2$ | NaCl | NaOH Required to Maintain pH 6.2–6.8 During Reaction Period (ml 1% soln., cumulative) | | | | pH After Bisulfite Addition | Fluidity (APF) | Carboxyl Content % wt. |
| | | | | 5 min. | 10 min. | 20 min. | 30 min. | | | |
| | none | | | 0.1 | 0.1 | 0.1 | 0.1 | 5.85 | 204 | 0.10 |
| | 0.0178 | | | 0.1 | 0.2 | 0.2 | 0.2 | 5.85 | 208 | 0.10 |
| 0.0150 | | | | 0.5 | 0.5 | 0.6 | 0.6 | 5.85 | 209 | 0.10 |
| | | | 7.79 | 0.4 | 0.5 | 0.5 | 0.5 | 5.75 | 207 | 0.10 |
| | | 0.36 | | None | None | None | None | 2.40 | 206 | 0.10 |
| | 0.0178 | | 7.79 | 0.3 | 0.3 | 0.3 | 0.3 | 5.75 | 207 | 0.10 |
| 0.0150 | | | 7.79 | 0.3 | 0.5 | 0.5 | 0.5 | 5.80 | 207 | 0.10 |
| | | 0.36 | 7.79 | 0.5 | 0.7 | 0.7 | 0.7 | 2.25 | 207 | 0.09 |
| | 0.0178 | 0.36 | | 0.7 | 1.0 | 1.7 | 2.2 | 2.45 | 222 | 0.10 |

TABLE 1-continued

Comparison of Depolymerization Reaction Variables-
Interactions of Catalyst, Activator and Peroxide

| Reactants Added (percent) | | | | Reaction System | | | | | Finished Product | |
|---|---|---|---|---|---|---|---|---|---|---|
| CuCl$_2$ | CuSO$_4$ | H$_2$O$_2$ | NaCl | NaOH Required to Maintain pH 6.2–6.8 During Reaction Period (ml 1% soln., cumulative) | | | | pH After Bisulfite Addition | Fluidity (APF) | Carboxyl Content % wt. |
| | | | | 5 min. | 10 min. | 20 min. | 30 min. | | | |
| 0.0150 | | 0.36 | | 0.3 | 0.5 | 1.2 | 1.7 | 2.50 | 214 | 0.10 |
| | 0.0178 | 0.36 | 7.79 | 3.7 | 6.1 | 7.7 | 8.0 | 5.85 | 243 | 0.11 |
| 0.0150 | | 0.36 | 7.79 | 3.5 | 5.7 | 7.5 | 7.8 | 5.80 | 244 | 0.11 |

From the above table, it can be seen that when no reactants were added substantially no alkali was required to maintain the reaction pH and the addition of bisulfite lowered the pH only slightly. Substantially the same pattern of little to no effect was obtained when the catalyst or an activator were added singly or in various combinations. The small increases in fluidity were caused by retained salts in the products.

The above table also shows that the addition of hydrogen peroxide alone or in combination with an activator resulted in no action on the starch, no alkali consumption after the initial amount, but a large decrease in pH when bisulfite was added. This pH decrease was caused by peroxide oxidation of bisulfite to bisulfate and thus was a useful indicator of the amount of peroxide present. It is apparent that an activator, e.g., sodium chloride, had no effect on the peroxide.

The addition of hydrogen peroxide together with a catalyst resulted in definite changes as shown by the increase in fluidity and slow consumption of alkali. The low pH after bisulfite addition showed that a large proportion of the added peroxide was still present. A much longer reaction time would have been necessary to permit the peroxide to act more thoroughly on the starch than was possible in the short reaction time of the example.

The above table shows the unexpected results that were obtained when an activator was added in combination with hydrogen peroxide and catalyst. Even in the short reaction time used, the fluidity was markedly increased and the peroxide was entirely consumed as shown by the high pH after bisulfite addition. The increase in carboxyl content of the product was surprisingly small in view of the amount of alkali needed to maintain reaction pH.

EXAMPLE II

This example illustrates the effect of varying the concentration of cupric ions in the process of the present invention.

Granular corn starch was mixed with sufficient deionized water to obtain two 300 ml slurries each containing 39.1 percent starch. The slurries were placed in containers each equipped with a stirrer and then heated to 120°F. To each of the slurries was added 6.6 percent NaCl and either 0.0075 or 0.030 percent copper chloride. Then 0.36 percent hydrogen peroxide was added to each of the slurries and the pH thereof maintained at about 6.5 by periodically adding 1 percent sodium hydroxide solution. At the end of 30 minutes following the addition of the hydrogen peroxide, 0.5 g of sodium bisulfite was added to each of the slurries and pH adjusted to 6.5.

It was observed that foaming occurred in the slurry which contained the higher level of copper chloride indicating that the hydrogen peroxide was being decomposed at a rate faster than it could reach with the starch. Thus, there was a loss of efficiency of the hydrogen peroxide at the higher copper chloride level.

EXAMPLE III

This example illustrates the effect of varying the concentration of sodium chloride in the process of the present invention.

Granular corn starch was mixed with sufficient deionized water to obtain five 300 ml slurries each containing 39.1 percent starch. The slurries were placed in containers each equipped with a stirrer and heated to 120°F while being constantly agitated. Then, 0.015 percent cupric chloride and amounts of NaCl set forth in Table 2 below were added to each of the slurries. The slurries were then treated with hydrogen peroxide and handled in accordance with the procedure set forth in Example II. Various characteristics of the products were determined and are set forth in Table 2 below.

TABLE 2

Effects of NaCl Concentration

| Reaction System | | | | Finished Product | |
|---|---|---|---|---|---|
| NaCl Added (% wt.) | Degree of Foaming | NaOH Required to maintain pH 6.5 (ml. 1% soln.,cumulative) | pH After Bisulfite Addition | Fluidity, APF | Carboxyl Content (% wt.) |
| None | None | 1.7 | 2.5 | 214 | 0.10 |
| 0.8 | None | 3.5 | 2.5 | 229 | 0.10 |
| 1.6 | None | 6.0 | 3.1 | 238 | 0.10 |
| 3.2 | None | 9.0 | 5.2 | 243 | 0.10 |
| 6.6 | Slight | 7.8 | 5.4 | 240 | 0.10 |
| 40.7 | Vigorous | 7.5 | 5.2 | 231 | 0.10 |

From the above table it is seen that when excessive amounts of NaCl are present, the efficiency of the hydrogen peroxide utilization is decreased as indicated by the degree of foaming observed in the reaction mixture. Additionally, it is seen that at optimum levels of NaCl the effect of the hydrogen peroxide on the fluidity of the finished starch product is greater.

EXAMPLE IV

This example illustrates the effect of varying the pH of the reaction mixture during the depolymerization reaction.

Granular corn starch was mixed with sufficient deionized water to obtain seven 1500 ml slurries each containing 33.8 percent starch. The slurries were placed in containers each equipped with a stirrer and heated to 120°F with constant stirring. The pH of the slurries was adjusted to the values set forth in Table 3 with 2 percent sodium hydroxide solution or 20° Bé muriatic acid. Then, 0.015 percent anhydrous cupric chloride and 0.48 percent hydrogen peroxide were added to each of the slurries. The pH was maintained at the levels set forth in Table 3 by the periodic addition of a 2 percent sodium hydroxide solution. The reactions were terminated after 4 hours by adjusting the pH of the slurries to 6.0 with 20° Bé muriatic acid or 2 percent sodium hydroxide solution as required. The slurries were filtered, the filter cakes washed with one cake volume of water and then puddled and dried at 180°F in a laboratory model Proctor & Schwartz forced air drier. The amounts of unreacted hydrogen peroxide in the reaction mixtures and various characteristics of the resulting starch products were determined and are set forth in Table 3 below.

products prepared outside this pH range. Also, it is seen that when the products were prepared at the lower pH levels, significantly lesser amounts of alkali are required to maintain the reaction pH at the desired level. There was no hydrogen peroxide activator present during the reactions which accounts for the relatively high levels of unreacted hydrogen peroxide present.

EXAMPLE V

This example illustrates the effect of varying the amount of hydrogen peroxide and the reaction period.

Granular corn starch was mixed with sufficient deionized water to obtain three 6000 ml slurries each containing 33.8 percent starch. The slurries were placed in containers each equipped with a stirrer and then heated to 120°F with constant stirring. The pH of the slurries was adjusted to 6.5 and then 0.015 percent cupric chloride and the amounts of hydrogen peroxide set forth in Table 4 were added. At various periods, 500 ml portions of the slurries were removed from the containers, filtered and washed. A portion of the filter cake was dried in a laboratory model Proctor & Schwartz drier at an air temperature of 180°F. The APF fluidities of the starch on the filter and of the finished starch were determined as were other characteristics of the finished starch. The results are set forth in Table 4, below.

TABLE 3

Effects of pH Level of Reaction System

| | Reaction System | | Finished Product | | |
|---|---|---|---|---|---|
| Reaction pH | NaOH Required to Maintain Constant pH (ml. 2% soln.,cumulative) | Residual $H_2O_2$ in Reaction Slurry % of DS Starch | Fluidity, APF | Carboxyl Content (% wt.) | pH |
| 10.0 | 126.0 | 0.002 | 255 | 0.156 | 7.8 |
| 7.0 | 85.0 | 0.002 | 280 | 0.174 | 7.7 |
| 6.5 | 85.7 | 0.016 | 282 | 0.202 | 7.3 |
| 6.0 | 55.6 | 0.103 | 281 | 0.193 | 6.8 |
| 5.5 | 42.2 | 0.182 | 280 | 0.174 | 6.6 |
| 5.0 | 29.2 | 0.221 | 280 | 0.173 | 6.5 |
| 3.0 | 24.4 | 0.449 | 255 | 0.129 | 6.2 |

TABLE 4

Effects of Peroxide Concentration and Reaction Time

| | Reaction System | | Finished Product | |
|---|---|---|---|---|
| $H_2O_2$ Conc. (% wt.) | Reaction Time (Hrs.) | Fluidity, APF of starch prior to drying | Fluidity, APF of starch after drying | Carboxyl Content % wt. |
| 0.24 | 0.5 | 218 | 218 | 0.106 |
|  | 1.0 | 231 | 233 | 0.119 |
|  | 1.5 | 244 | 246 | 0.115 |
|  | 2.0 | 253 | 255 | 0.129 |
|  | 3.0 | 262 | 263 | 0.129 |
|  | 4.0 | 269 | 269 | 0.147 |
| 0.48 | 1.0 | 253 | 256 | 0.138 |
|  | 1.5 | 269 | 271 | 0.147 |
|  | 2.0 | 276 | 277 | 0.165 |
|  | 2.5 | 279 | 280 | 0.165 |
|  | 3.0 | 281 | 282 | 0.184 |
|  | 3.5 | 282 | 283 | 0.202 |
|  | 4.0 | 283 | 283 | 0.202 |
| 0.96 | 0.5 | 269 | 271 | 0.156 |
|  | 1.0 | 281 | 282 | 0.207 |
|  | 1.5 | 284 | 285 | 0.211 |
|  | 2.0 | 286 | 287 | 0.239 |
|  | 3.0 | 288 | 289 | 0.243 |
|  | 4.0 | 288 | 289 | 0.262 |

From the above table it is seen that the APF fluidities of the depolymerized starch products prepared at reaction pH's in the range of 7 to 5 were significantly greater than the fluidities of depolymerized starch From the above table, it is seen that at the levels of hydrogen peroxide used, a 4 hour reaction period is sufficient to obtain maximum changes in APF fluidity.

Moreover, it is seen that the rate at which a given APF fluidity is achieved is proportional to the amount of hydrogen peroxide present.

EXAMPLE VI

This example illustrates the effect of various salts on the hydrogen peroxide depolymerization reaction.

Depolymerization reactions were performed in accordance with the procedure set forth in Example II using 0.015 percent cupric chloride and 6.6 percent of the salts set forth in Table 5.

TABLE 5

Effects of Particular Salts

| Salt | Reaction System | | | Finished Product | |
|---|---|---|---|---|---|
| | ml 1% NaOH to maintain pH 6.5 | Foaming Tendency | pH after Bisulfite Addition | Fluidity, APF | Carboxyl Content % wt. |
| NaCl | 7.8 | Slight | 5.4 | 240 | 0.10 |
| NH$_4$Cl | 6.5 | Slight | 6.0 | 233 | 0.10 |
| FeCl$_3$ | Precipitate formed and reaction discontinued | | | — | — |
| KCL | 9.8 | None | 5.8 | 245 | 0.12 |
| Na$_2$CrO$_4$ | 9.0 | Slight | 6.5 | 214 | 0.11 |
| NaNO$_3$ | 3.0 | None | 2.5 | 221 | 0.11 |
| Na$_3$PO$_4$ | None | None | 6.3 | 208 | 0.10 |
| Na$_2$SO$_4$ | 3.0 | None | 3.2 | 220 | 0.11 |

From the above table, it is apparent that only the salts selected from the group consisting of alkali metal and ammonium chlorides had any significant effect on the hydrogen peroxide depolymerization reaction.

EXAMPLE VII

This example illustrates various properties of depolymerized starch products prepared by the method of the present invention and compares such properties with the properties of depolymerized starch products prepared by hypochlorite oxidation of starch.

Depolymerized starch products were prepared with the procedure set forth in Example V using 0.96 percent H$_2$O$_2$. Samples were taken at various intervals and 0.35 percent sodium bisulfite added to each sample to terminate the reaction.

The hypochlorite depolymerized starch products were prepared by heating slurries of starch containing 35 to 39 percent starch to 100°F and incorporating therein various amounts of a sodium hypochlorite solution (9.3 chlorine per 100 ml of solution). The slurries were filtered, the filter cakes washed and then puddled and dried at 180°F in a laboratory model Proctor & Schwartz forced air drier.

The inherent viscosities and the carboxyl contents of the depolymerized starch products were determined and are set forth in Table 6 below.

TABLE 6

Comparison of Peroxide Depolymerization With Hypochlorite Depolymerization

| Peroxide Depolymerization | | Hypochlorite Depolymerization | |
|---|---|---|---|
| Inherent Viscosity dl/g | Carboxyl Content % wt. | Inherent Viscosity dl/g | Carboxyl Content % wt. |
| 1.892 | 0.106 | 1.000 | 0.26 |
| 1.487 | 0.119 | 0.900 | 0.28 |
| 1.342 | 0.115 | 0.800 | 0.31 |
| 1.016 | 0.138 | 0.700 | 0.36 |
| 0.838 | 0.138 | 0.600 | 0.42 |
| 0.654 | 0.151 | 0.500 | 0.51 |
| 0.587 | 0.184 | 0.400 | 0.66 |
| 0.459 | 0.193 | 0.300 | 0.97 |

TABLE 6-continued

Comparison of Peroxide Depolymerization With Hypochlorite Depolymerization

| Peroxide Depolymerization | | Hypochlorite Depolymerization | |
|---|---|---|---|
| Inherent Viscosity dl/g | Carboxyl Content % wt. | Inherent Viscosity dl/g | Carboxyl Content % wt. |
| 0.384 | 0.240 | 0.270 | 1.10 |

It is readily apparent from the above data that depolymerization to any given inherent viscosity by means of hydrogen peroxide introduced less carboxyl groups into the starch than when hypochlorite was used.

EXAMPLE VIII

This example compares the characteristics of a hydrogen peroxide depolymerized starch product with the characteristics of an acid modified starch.

Granular corn starch was mixed with sufficient water to obtain 5000 ml of slurry containing 35.5 percent starch. The slurry was placed in a container equipped with a stirrer and then heated to 129°F with constant stirring. The pH of the slurry was adjusted to 6.5 with 2 percent NaOh and 0.015 percent cupric chloride and 0.36 percent hydrogen peroxide added. During the reaction, the pH of the mixture was maintained at 6.5 by the periodic addition of a 2 percent NaOH solution. After 3 hours, the reaction was terminated by adding 0.32 percent sodium bisulfite. The pH of the mixture at this stage was 3.6 which was adjusted to 6 by the addition of a 2 percent NaOH solution. The mixture was filtered and the filter cake washed with 1 filter cake volume of water. The cake was puddled and dried in a laboratory model Proctor & Schwartz drier at an air temperature of 190°F. Various properties of the starch product were determined and compared with the properties of an acid modified starch having substantially the same APF fluidity. These properties are set forth in Table 7 below.

TABLE 7

Comparison of Peroxide Depolymerized Starch With Acid Modified Starch

| Properties Tested | Peroxide Depolymerized | Acid-Modified(1) |
|---|---|---|
| Fluidity, APF, 18 g 10% Ms. | 271 | 270.5 |
| Hot Fluidity, 18 g 10% Ms. | 71 | 68 |
| Setback Fluidity, 24 hours | 38 | 10 |

TABLE 7-continued
Comparison of Peroxide Depolymerized Starch With Acid Modified Starch

| Properties Tested | | Peroxide Depoly-merized | Acid-Modified(1) |
|---|---|---|---|
| Carboxyl, % db | | 0.14 | 0.10 |
| Brabender Cook, pH 6.5, 10% wt., dry basis | | | |
| Temp.,°F, | Start gelatinize | 153 | 157 |
| ", | at Vis. Peak | 176 | 176 |
| Vis.,B.U., | Peak | 343 | 143 |
| ", | End 30 min. Heat to 203°F. | 98 | 49 |
| ", | End 30 min. Hold 203°F. | 28 | 28 |
| ", | End 30 min. Cool to 122°F. | 98 | 87 |
| ", | End 30 min. Hold 122°F. | 154 | 172 |
| Gaertner Aged Gel Strength G-Cm | | 264 | 440 |

(1)Clinton 260 B, Clinton Corn Processing Co., Clinton, Iowa.

Comparing the setback fluidity, Brabender viscosity, change on holding at 122°F and aged gel strength, it is apparent that the hydrogen peroxide depolymerized starch product had substantially less tendency to retrograde than did the acid modified starch.

The terms and expressions which have been employed are used as terms of description and not of limitation, and it is not intended in the use of such terms and expressions to exclude any equivalents of the features shown and described.

What is claimed is:

1. A process for partially depolymerizing granular starch comprising reacting granular starch with hydrogen peroxide in an aqueous mixture in the presence of a salt selected from the group consisting of alkali metal chlorides, ammonium chlorides and mixtures thereof, and cupric ions while maintaining the pH of the aqueous mixture in the range of from about 5.5 to about 7 by the addition of alkali thereto, the reaction conditions being such as to maintain the granular structure of the starch.

2. A process for partially depolymerizing granular starch as defined in claim 1, wherein the amount of hydrogen peroxide reacted with the granular starch is from about 0.5 to about 2 percent by weight based upon the dry substance weight of the starch.

3. A process for partially depolymerizing granular starch as defined in claim 2, wherein the amount of the salt present is from about 1 to about 5 percent by weight based upon the dry substance weight of the starch.

4. A process for partially depolymerizing granular starch as defined in claim 3, wherein the amount of cupric ions present is from about 0.0005 to about 0.025 percent by weight based upon the dry substance weight of the starch.

5. A process for partially depolymerizing granular starch as defined in claim 3, wherein the amount of cupric ions present is from about 0.0025 to about 0.01 percent by weight based upon the dry substance weight of the starch.

6. A process for partially depolymerizing granular starch as defined in claim 5, wherein the reaction is performed at a temperature of from about 100° to about 140°F.

7. A process for partially depolymerizing granular starch as defined in claim 6, wherein the reaction is performed at a temperature of from about 110° to about 130°F.

8. A process for partially depolymerizing granular starch as defined in claim 7, wherein the reaction is performed for a period of from about 3 to about 30 minutes.

* * * * *